June 10, 1941.  R. W. DICELY  2,245,525

LOCKING MEANS

Filed Aug. 3, 1939

Inventor
RALPH W. DICELY,
By Richard E. Babcock
Attorney

Patented June 10, 1941

2,245,525

UNITED STATES PATENT OFFICE 2,245,525

LOCKING MEANS

Ralph W. Dicely, Lancaster, Pa., assignor to Mac-It Parts Company, Lancaster, Pa., a corporation of Pennsylvania Application August 3, 1939, Serial No. 288,211

4 Claims. (Cl. 151—32)

This invention relates to locking means and is particularly adapted for use with cup pointed set screws, though it is also capable of other applications.

The primary objects of the invention are: to provide simple efficient positive locking means for set screws or other screw-threaded members; and to provide such locking means which may be easily and cheaply applied to the cupped portion of a set screw or other rotatable screw-threaded member.

Figure 1:
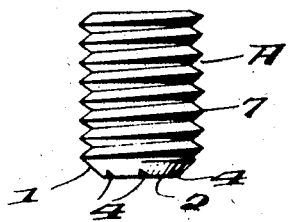
Figure 4:
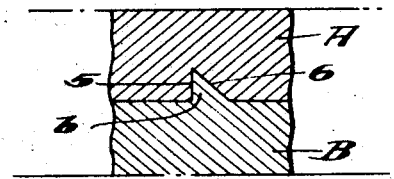
Figure 2:
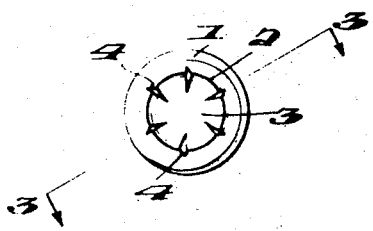
Figure 5:
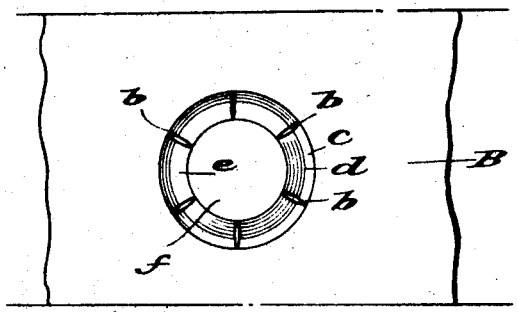
Figure 3:
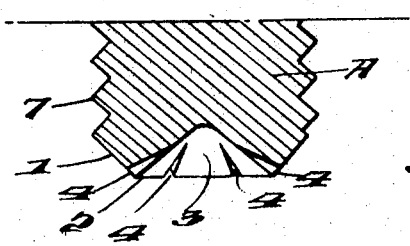
Figure 6:
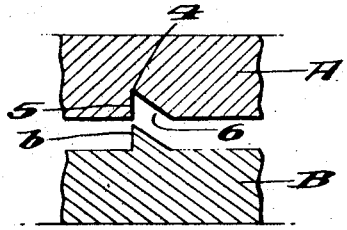

In the accompanying drawing:

Figure 1 represents a side elevation of a hollow cup point set screw embodying my invention;

Figure 2, a bottom plan view thereof;

Figure 3, an enlarged fragmentary sectional view on the line 3—3 of Figure 2, looking in the direction of the arrows;

Figure 4, an enlarged fragmentary transverse section through one of the locking means or grooves of the invention as applied in operative relation to a shaft or other object;

Figure 5, an enlarged top plan fragmentary view of a shaft or other object showing the imprint made therein by a set screw embodying my invention when tightened thereagainst; and, Figure 6, a view similar to Figure 4, but with the portions of the set screw A and shaft or other object B respectively in spaced or "exploded" relation.

Referring now in detail to the accompanying drawing, wherein I have shown a preferred application of my invention, the letter A designates any usual form of cup pointed set screw, which in the present instance is of the usual well known hollow type. The cupped point of this set screw A is preferably in the form of a truncated cone having radially inwardly tapering sides 1. Formed in the lower end of said point is a cup or cupped portion or depression 3 which may be of substantially conical shape, although this is not essential. The sides of said cup 3 intersect the exterior preferably conical sides 1 of said point to form a sharp annular edge 2, all of which is usual and well known to those skilled in the art.

My invention, as applied to such a set screw A, consists of preferably a plurality of substantially radially extending preferably equally spaced locking grooves or furrows or channels 4 formed in the cup or cupped portion 3 of the point and preferably intersecting the annular edge 2 thereof.

As shown in detail in Figures 4 and 6 of the drawing, each said groove 4 is preferably of roughly V-shaped cross-section, being provided with or defined by a preferably radially extending leading side or edge or locking edge 5 in a plane lying substantially parallel to the axis of said screw A, and a trailing edge or side 6 disposed at an angle to said leading or locking edge 5.

Thus it may be seen that in operation, as the set screw A is screwed tight so that the annular edge 2 of its point cuts into a shaft or other object B, in the usual manner, the metal or other material of which the shaft is composed is confined and compressed within the cupped portion 3 and in seeking to expand, or to resist such compressing and confining action, flows into and fills the grooves 4 to form cooperating locking shoulders or abutments b of a shape substantially similar to said grooves 4.

If after once tightening the screw A it is desired to further tighten the same, it may be seen that in so doing the angular trailing edge 6 of each groove 4 will tend to ride over and smooth out its respective cooperating shoulder b while at the same time a new shoulder b is being continuously formed or built up in groove 4 ahead of said trailing edge 6.

In the tightened or locked condition of the screw A it may be seen that the leading or locking edge 5 of each groove 4 lies flush against the upright edge of its respective cooperating shoulder or abutment b and that both of said opposed edges or sides are disposed substantially perpendicularly to the direction of rotation of screw A, hence serve to firmly and positively lock said screw in tightened position.

In order to loosen or remove screw A it is necessary to rotate the same with a sufficient degree of force to sheer off all of said projections or shoulders b, and consequently there is no chance of said screw A being accidentally loosened through vibration or other causes.

Although for the purpose of illustrating the invention the same has herein been illustrated and described as embodied in a hollow cup point set screw, and is primarily intended for use with set screws, it is not limited to such use but may be applied to other forms of screws or set screws or to any rotatable threaded member having a cupped bearing surface adapted to be rotated into engagement with another object.

I claim:

1. A set screw formed at its leading end with a smooth surfaced substantially conical cup concentric throughout to the rotational axis of said set screw and of uniform radius in any given plane perpendicular to said axis, and a sharp annular leading edge defining the mouth of said cup, the surface of said cup being interrupted at regularly spaced intervals by a plurality of radially extending locking grooves so spaced and disposed as to leave a smooth unbroken substantially conical surface portion between each adjacent pair of said locking grooves, each said groove being defined by a leading wall disposed in a radial plane substantially parallel to the set screw axis, and a trailing wall disposed at an angle to the set screw axis, whereby the material of the work piece received in said cup as said leading edge is forced into engagement with and bites into the work piece is confined by the smooth surface portions of said cup and caused by the resulting high pressure to flow into said locking grooves to form locking shoulders conforming in shape to said respective grooves.

2. A set screw formed at its leading end with a smooth surfaced substantially conical cup concentric throughout to the rotational axis of said set screw and of uniform radius in any given plane perpendicular to said axis, and a sharp annular leading edge defining the mouth of said cup, the surface of said cup being interrupted at regularly spaced intervals with a plurality of radially extending locking grooves so spaced and disposed as to leave a smooth unbroken substantially conical surface portion between each adjacent pair of said grooves, each said groove being defined by a leading wall disposed in a plane substantially parallel to the set screw axis, and a trailing wall disposed at an angle to the set screw axis.

3. A set screw formed at its leading end with a smooth surfaced substantially conical cup concentric throughout to the rotational axis of said set screw and of uniform radius in any given plane perpendicular to said axis, and a sharp annular leading edge defining the mouth of said cup, the surface of said cup being interrupted by a locking groove formed in the side wall thereof in such manner as to leave a smooth substantially conical surface portion on either side of said groove, said groove being defined by a leading wall disposed substantially parallel to the set screw axis and a trailing wall disposed at an angle to said axis, whereby the material received in said cup as said leading edge is turned into engagement with the work piece is confined by the smooth surface portions of said cup and pressed into said locking grooves.

4. A rotatable screw threaded member formed at its leading end with a smooth surfaced substantially conical cup concentric throughout to the axis of rotation of said member and of uniform radius in any given plane perpendicular to said axis, and a sharp annular leading edge defining the mouth of said cup, the smooth surface of said cup being interrupted by a locking groove formed therein in such manner as to leave a smooth substantially conical surface portion on each of the circumferentially opposed sides of said groove, said groove being defined by a leading wall disposed substantially parallel to the axis of rotation of said member and a trailing wall disposed at an angle to said axis.

RALPH W. DICELY.